United States Patent
Ollis et al.

(10) Patent No.: US 11,731,630 B2
(45) Date of Patent: Aug. 22, 2023

(54) METHODS AND SYSTEMS FOR ASSERTING RIGHT OF WAY FOR TRAVERSING AN INTERSECTION

(71) Applicant: FORD GLOBAL TECHNOLOGIES, LLC, Dearborn, MI (US)

(72) Inventors: Mark Ollis, Pittsburgh, PA (US); Christopher Cunningham, Pittsburgh, PA (US); Neal Seegmiller, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 242 days.

(21) Appl. No.: 17/241,238

(22) Filed: Apr. 27, 2021

(65) Prior Publication Data
US 2022/0340137 A1    Oct. 27, 2022

(51) Int. Cl.
*B60W 30/18* (2012.01)
*G05D 1/00* (2006.01)
*G05D 1/02* (2020.01)

(52) U.S. Cl.
CPC ..... *B60W 30/18159* (2020.02); *G05D 1/0088* (2013.01); *G05D 1/0214* (2013.01);
(Continued)

(58) Field of Classification Search
CPC .............. G05D 1/0088; G05D 1/0214; G05D 2201/0213; B60W 30/18159;
(Continued)

(56) References Cited

U.S. PATENT DOCUMENTS

| 8,559,673 B2 | 10/2013 | Fairfield et al. |
| 9,707,960 B2 | 7/2017 | Gutmann et al. |
| (Continued) | | |

FOREIGN PATENT DOCUMENTS

| CN | 110298122 A | * 10/2019 | ........... G06K 9/6256 |
| CN | 110298122 A | 10/2019 | |

OTHER PUBLICATIONS

Machine Translation of Chen's reference (CN-110298122-A) (Year: 2019).*
(Continued)

*Primary Examiner* — Tarek Elarabi
(74) *Attorney, Agent, or Firm* — Frank MacKenzie; Brooks Kushman P.C.

(57) ABSTRACT

Systems and methods for controlling navigation of an autonomous vehicle for making an unprotected turn while traversing an intersection. The methods may include identifying a loiter pose of an autonomous vehicle for stopping at a point in an intersection before initiating an unprotected turn, initiating navigation of the autonomous vehicle to the loiter pose when a traffic signal is at a first state, determining whether the traffic signal has changed to a second state during or after navigation of the autonomous vehicle to the loiter pose, and in response to determining that the traffic signal has changed to the second state, generating a first trajectory for navigating the autonomous vehicle to execute the unprotected turn if the expected time for moving the autonomous vehicle from a current position to a position when the autonomous vehicle has fully exited an opposing conflict lane is less than a threshold time.

28 Claims, 9 Drawing Sheets

(52) U.S. Cl.
CPC ... *B60W 2520/10* (2013.01); *B60W 2520/105* (2013.01); *B60W 2520/12* (2013.01); *B60W 2520/125* (2013.01); *B60W 2520/14* (2013.01); *B60W 2552/30* (2020.02); *B60W 2554/406* (2020.02); *B60W 2554/4041* (2020.02); *B60W 2554/4046* (2020.02); *B60W 2555/60* (2020.02); *G05D 2201/0213* (2013.01)

(58) Field of Classification Search
CPC ..... B60W 2554/4041; B60W 2552/30; B60W 2555/60; B60W 2554/406; B60W 2554/4046; B60W 2520/10; B60W 2520/105; B60W 2520/12; B60W 2520/125; B60W 2520/14
See application file for complete search history.

(56) References Cited

U.S. PATENT DOCUMENTS

| | | | |
|---|---|---|---|
| 10,005,460 | B2 | 6/2018 | Gutmann et al. |
| 10,005,464 | B2 | 6/2018 | Toyoda et al. |
| 10,507,807 | B2 | 12/2019 | Ben Shalom |
| 10,576,984 | B2 | 3/2020 | Kanzawa |
| 11,345,335 | B1 * | 5/2022 | Luders .................. G08G 1/167 |
| 2018/0074502 | A1 * | 3/2018 | Holben ........... B60W 30/18154 |
| 2018/0259957 | A1 | 9/2018 | Charrow et al. |
| 2018/0281803 | A1 * | 10/2018 | Mukai .................. G05D 1/0214 |
| 2019/0009782 | A1 * | 1/2019 | Kanzawa ............. B60W 30/10 |
| 2021/0341926 | A1 * | 11/2021 | McKnew ............. G05D 1/0214 |
| 2021/0403050 | A1 * | 12/2021 | Gan .................. B60W 30/0956 |

OTHER PUBLICATIONS

PCT/ISA/220 and PCT/ISA/237 International Search Report and Written Opinion for PCT/US2022/071917 dated Aug. 10, 2022, 7 pages.

Matheson, Rob, "Better Autonomous 'Reasoning' at Tricky Intersections," Massachusetts Institute of Technology, MIT News Office, Nov. 4, 2019.

U.S. Appl. No. 17/241,285, filed Apr. 27, 2021, Methods and Systems for Generating Trajectory of an Autonomous Vehicle for Traversing an Intersection.

* cited by examiner

METHODS AND SYSTEMS FOR ASSERTING RIGHT OF WAY FOR TRAVERSING AN INTERSECTION

BACKGROUND

Successful design and deployment of autonomous vehicles (AV) requires finding an optimal road/lane-level path from the AV's current location to a specified destination in a map including a road network. Routes typically require traversing intersections that include a common area through which vehicles pass and from which vehicles can approach from a plurality of directions. Such intersections are one of the more challenging scenarios for an AV to handle because decisions about when to proceed into the intersection must be made with consideration of traffic controls (i.e. signs or traffic signals) and predicted actions of other road-users. The challenges are exacerbated when the AV needs to execute an "unprotected turn" where the AV must cross or merge into one or more lanes in which other road-users have the right-of-way (i.e., traverse a conflict lane).

Prior art methods typically require the AV to wait outside of the intersection before executing an unprotected turn until all conflict lanes are clear of other road-users or traffic before proceeding through the intersection along a predefined path. However, when there is a constant stream of traffic in one or more conflict lanes, such methods cause the AV to wait indefinitely. This is particularly problematic at signal-controlled intersections when the AV fails to complete a turn within a light cycle (i.e. the light changes from red to green and back to red before the AV completes the turn).

Furthermore, there may be situations where the autonomous vehicle may need to initiate and/or complete the turn after the traffic light has turned yellow and/or red. In such situations, while as per traffic laws, objects in the conflict lanes have right-of-way over the autonomous vehicle; social conventions allow a vehicle executing an unprotected turn to assert right-of-way over objects in the conflict lanes for a period of time.

This document describes methods and systems that are directed to addressing the problems described above, and/or other issues.

SUMMARY

In one or more scenarios, systems and methods for controlling navigation of an autonomous vehicle for making an unprotected turn while traversing an intersection. The system may include a processor and a non-transistor computer-readable that includes programming instructions that can be executed by the processor to perform the disclosed methods. The methods may include identifying a loiter pose of an autonomous vehicle that is a pose of the autonomous vehicle for stopping at a point in an intersection before initiating an unprotected turn. The methods may also include initiating navigation of the autonomous vehicle to the loiter pose when a traffic signal is at a first state in which the autonomous vehicle is allowed to move through the intersection. During or after navigation of the autonomous vehicle to the loiter pose, the methods may include determining whether the traffic signal has changed to a second state that is a transient state before the traffic signal will change to a third state in which the autonomous vehicle is not allowed to move through the intersection. In response to determining that the traffic signal has changed to the second state, the methods may include generating a first trajectory for navigating the autonomous vehicle to execute the unprotected turn if the expected time for moving the autonomous vehicle from a current position to a position when the autonomous vehicle has fully exited an opposing conflict lane is less than a threshold time. Optionally, the methods may also include causing the autonomous vehicle to execute the unprotected turn using the first trajectory.

In various implementations, the methods may also include generating the first trajectory for navigating the autonomous vehicle to execute the unprotected turn if the distance between the current position of the autonomous vehicle and the position when the autonomous vehicle has fully exited the opposing conflict lane is less than a threshold distance, in response to determining that the traffic signal has changed to the second state.

In certain other implementations, the methods also include determining whether the traffic signal has changed to the third state during or after navigation of the autonomous vehicle to the loiter pose, and in response to determining that the traffic signal has changed to the third state: analyzing real-time conditions of the intersection, and generating a second trajectory for navigating the autonomous vehicle to execute the unprotected turn while the traffic signal is in the third state if the real-time conditions do not indicate a collision risk. Additionally and/or alternatively, the methods may include computing a reactive trajectory of an object in the opposing conflict lane that is indicative of the object's reaction to the autonomous vehicle asserting right-of-way over the object when the traffic signal is in the third state, analyzing the reactive trajectory to determine whether the object will yield right-of-way to the autonomous vehicle for executing the unprotected turn when the traffic signal is in the third state, and determining that the real-time conditions do not indicate the collision risk if the object will yield right-of-way to the autonomous vehicle for executing the unprotected turn when the traffic signal is in the third state. Optionally, the methods may also include determining that the real-time conditions indicate the collision risk in response to determining that the object will not yield right-of-way to the autonomous vehicle for executing the unprotected turn when the traffic signal is in the third state, and generating a third trajectory for navigating the autonomous vehicle to come to a stop at a stop position outside the intersection if the real-time conditions indicate the collision risk. In such embodiments, the reactive trajectory may be computed using a cost function that does not include a penalty for the autonomous vehicle violating right-of-way traffic rules in asserting right-of-way over the object when the traffic signal is in the third state. In various such implementations, the methods also include analyzing real-time conditions of the intersection only in response to determining that the traffic signal has been in the third state for less than a first threshold time before the autonomous vehicle will enter the intersection.

In some implementations, the methods may also include generating a third trajectory for navigating the autonomous vehicle to come to a stop at a stop position outside the intersection if the expected time for moving the autonomous vehicle from the current position to the position when the autonomous vehicle has fully exited the opposing conflict lane is more than the threshold time in response to determining that the traffic signal has changed to the second state.

The loiter pose, optionally, may only be identified in response to determining that there is an object in a conflict lane whose forecasted trajectory will intersect with the autonomous vehicle's planned path for traversing the intersection within a threshold time.

In certain implementations, the methods may also include determining whether the expected time for moving the autonomous vehicle from the current position of the autonomous vehicle to the position when the autonomous vehicle has fully exited the opposing conflict lane is less than the threshold time based on, for example, a distance the autonomous vehicle will need to travel, a current speed of the autonomous vehicle, a road speed limit, a curvature along a trajectory of the autonomous vehicle, a minimum acceleration the autonomous vehicle can execute, a maximum acceleration the autonomous vehicle can execute, a desired smoothness of acceleration, or information about one or more objects in the intersection.

In one or more implementations, the loiter pose can include a stop location along a reference path for traversing the intersection, a lateral offset between the stop location and a reference point of the autonomous vehicle when in the loiter pose, and a yaw offset between a first heading of the autonomous vehicle when in the loiter pose and a second heading required to follow the reference path. In such implementations, the loiter pose may be identified by determining the stop location based on a cost function that can include factors such as, for example, a stop location that signals to other road users the autonomous vehicle's intent that the autonomous vehicle will proceed through the intersection at an earliest opportunity, kinematic feasibility of the autonomous vehicle to steer out of the loiter pose, duration that the autonomous vehicle will need to spend in one or more conflict regions when completing the unprotected turn out of the loiter pose, visibility of traffic signals from the loiter pose, visibility of oncoming objects in conflict lanes from the loiter pose, and/or the loiter pose being within an opposing lane. Additionally and/or alternatively, the loiter pose may be determined by determining the lateral offset and the yaw offset such that a minimum distance between a footprint of the autonomous vehicle when in the loiter pose and a conflict lane of the intersection is greater than or equal to a target distance. Optionally, the target distance may be determined such that an object in the conflict lane can pass the autonomous vehicle when in the loiter pose without colliding with the autonomous vehicle.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
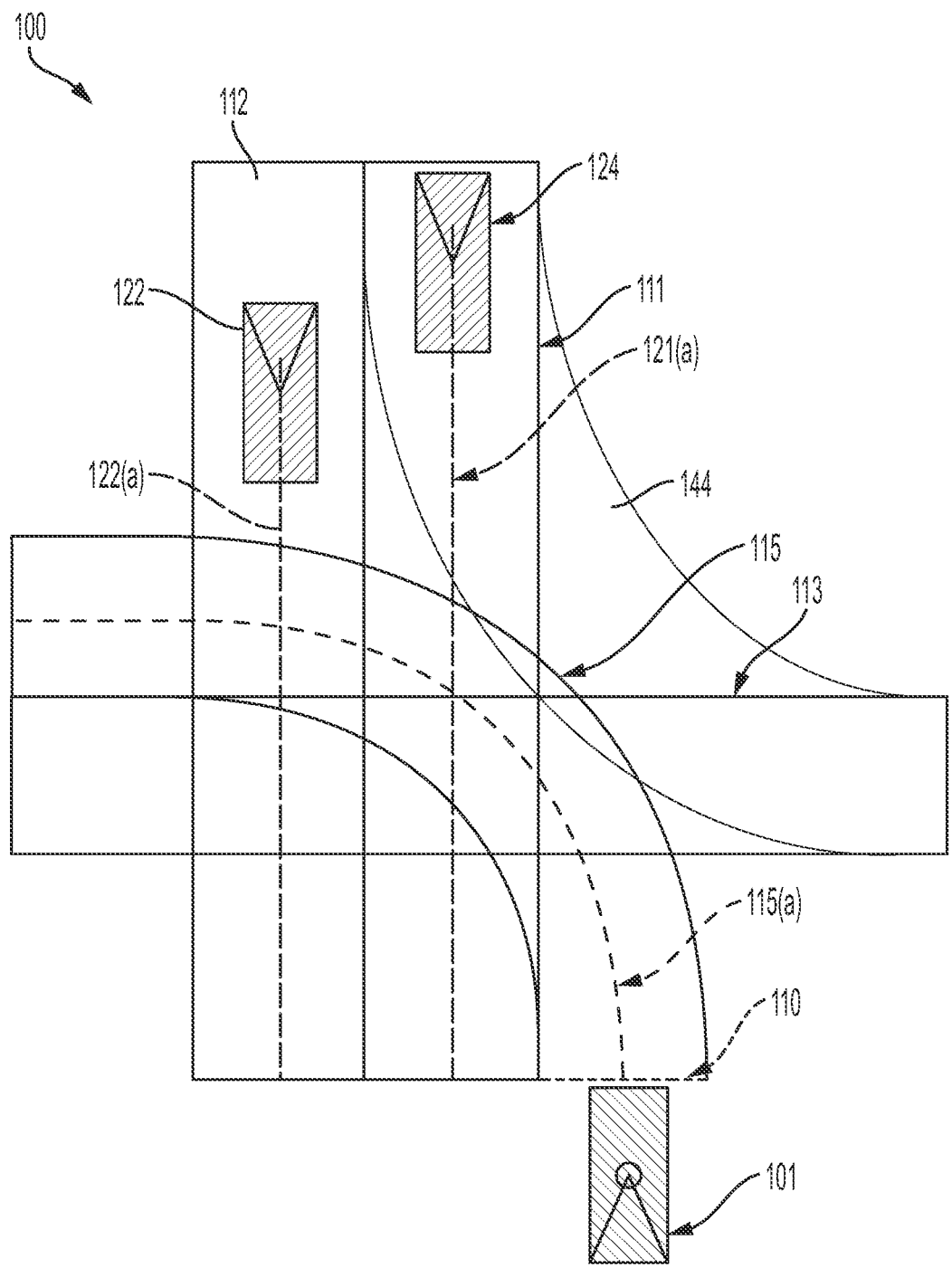
FIG. 1 illustrates an example intersection where an autonomous vehicle is required to execute an unprotected turn.

As discussed above, it is often difficult for an autonomous vehicle to quickly determine a suitable trajectory (which may include a path and target velocities and accelerations) to maneuver through an intersection while avoiding objects whose paths might intersect with that of the autonomous vehicle within some predetermined planning horizon. Such scenarios arise, for example, while taking an unprotected left turn where the autonomous vehicle must cross or merge with one or more "conflict lanes" in which other objects or road-users have the right of way. Autonomous vehicles typically wait outside of the intersection until all conflict lanes are clear of traffic, and then proceed through the intersection along a predefined trajectory. As used herein, a conflict lane is a lane that the autonomous vehicle needs to cross and/or merge into and where it has to negotiate a right of way with other road users (e.g., when other road users have a right of way over the autonomous vehicle). For example, as shown in FIG. 1, when an autonomous vehicle 101 is planning to execute an unprotected left turn in lane 115 (having a reference path 115(a)), it may wait at a stop line 110 before entering the intersection 100. Executing the turn requires the autonomous vehicle to traverse conflict lanes (e.g., 111, 112 are opposing conflict lanes, and 113 is a cross conflict lane) where it must yield the right-of-way to other objects in such conflict lanes. However, when there is a constant stream of traffic in the conflict lane (e.g., objects 121 and 122 with corresponding predicted trajectories 121(a) and 122(a)), the autonomous vehicle may wait indefinitely at the stop line 110 unlike a human driver that typically pulls forward into the intersection and "loiters" (i.e., waits for a short time) in the intersection to signal a commitment to proceed through the intersection.

The current disclosure describes systems and methods for generating an autonomous vehicle trajectory for executing an unprotected turn through an intersection that includes loitering in a defined position that signals to other road users the autonomous vehicle's commitment to proceed through the intersection (similar to a human driver). The autonomous vehicle then proceeds through the intersection at the earliest safe opportunity (for example, when the planned trajectory is clear of approaching traffic and while the traffic light for the autonomous vehicle is green, or within a short time after the traffic light turns yellow/red for the autonomous vehicle).

Figure 2:
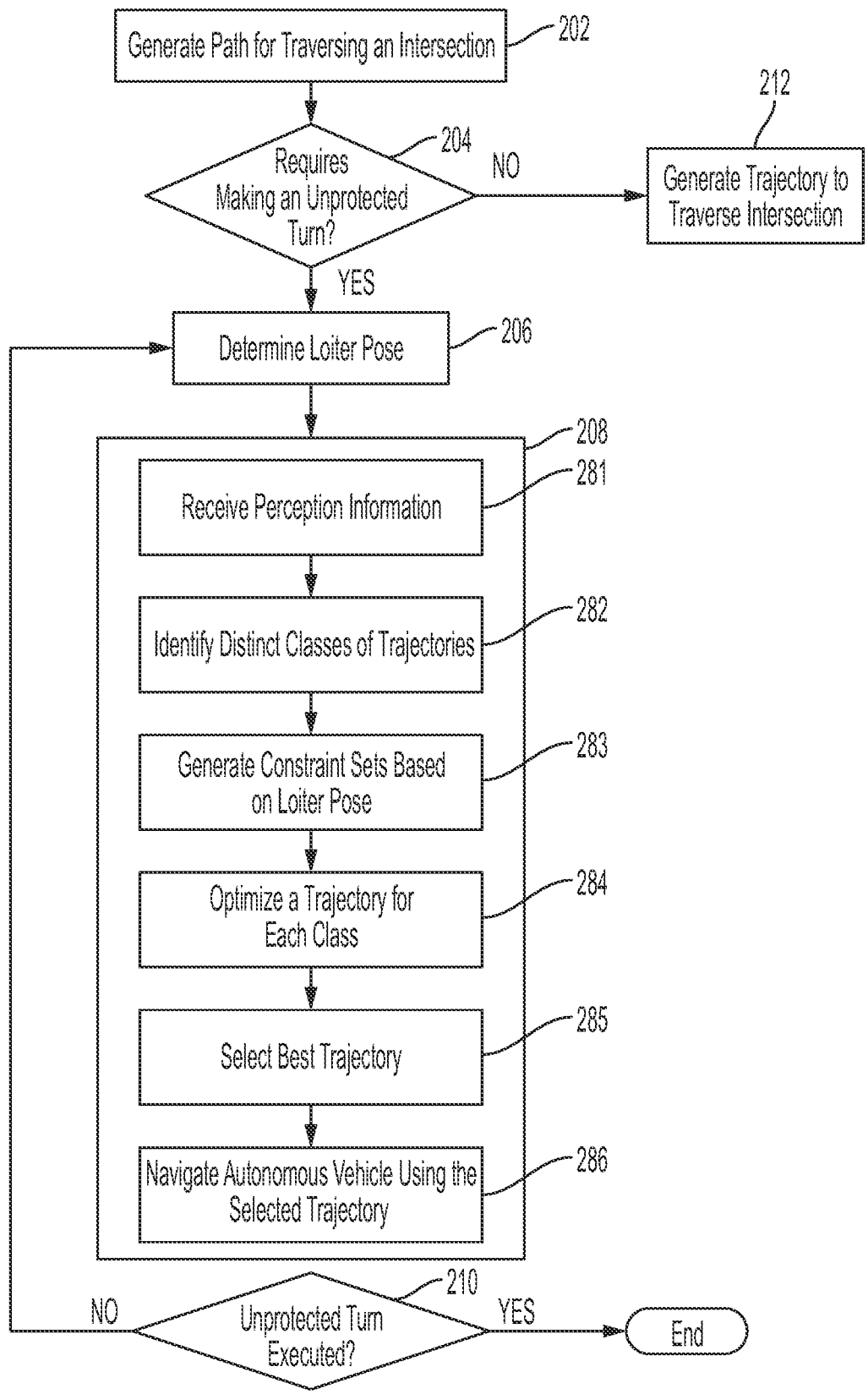
FIG. 2 illustrates a flowchart of an example method for generating a trajectory traversing an intersection is shown.

Referring now to FIG. 2, a flowchart illustrating an example method for trajectory generation for traversing an intersection is shown. As can be appreciated in light of the disclosure, the order of operation within the method is not limited to the sequential execution as illustrated in the figure, but may be performed in one or more varying orders as applicable and in accordance with the present disclosure. In various embodiments, the method can be scheduled to run based on one or more predetermined events, and/or can run continuously during operation of an autonomous vehicle.

At 202, the system may generate a route to a destination that may be represented as a sequence of contigual lanes/lane segments in a map that the autonomous vehicle can follow to reach the destination. The route may, optionally, be optimal with respect to a cost/reward function based solely on information in the road network (and not real-time perception information). For generating the path, the system may receive road network information corresponding to a geographical area of the interest from, for example, a map data store. In some embodiments, the road network information may include a map (e.g., a lane level map, a road level map, etc.) of the geographical location. A map may be a graphical representation of a collection of interconnected roads included in the geographical area, and may include roads, lanes, and lane segments. A road comprises one or more adjacent lanes, and lanes may be split longitudinally into lane segments.

The system may, optionally, generate a "reference path" through the lanes/lanes segments in the route. The reference path may correspond to common patterns of vehicle travel along one or more lanes. Such reference paths may be pre-defined such as the centerline of the traffic lanes. Optionally, the reference path may be generated based on historical observations of vehicles or other objects over a period of time (e.g., reference paths for straight line travel, lane merge, a turn, or the like). The reference path does not take into account real-time perception information relating to the environment of the autonomous vehicle. In various embodiments, the reference path may serve as a coordinate system for planning a trajectory, and the autonomous vehicle may not be constrained to follow the reference path through the lane.

At 204, the system may determine whether traversing the route requires the autonomous vehicle to execute an unprotected turn (e.g., an unprotected left turn, an unprotected right turn, an unprotected U-turn, etc.). As used herein, an "unprotected turn" refers to any turning maneuver made by an autonomous vehicle through an intersection without the aid of a traffic control (e.g. stop sign, or traffic light with green arrow), where the traffic control gives the autonomous vehicle right of way over other road-users in conflict lanes. As such, in an unprotected turn the autonomous vehicle must yield the right-of-way to oncoming objects (e.g., cyclists vehicles, etc.) before turning. Optionally, the system may also determine whether it is appropriate for the autonomous vehicle to loiter at a certain position in the intersection before and/or while executing the unprotected turn in order to yield the right-of-way to oncoming objects in the intersection. For example, loitering is not appropriate when there are multiple neighboring turn lanes and the autonomous vehicle will execute a turn from the inner lane, because a loiter pose for the inner turn lane could infringe on the outer turn lane. In another example, loitering may not be appropriate when a traffic signal supports a protected turn (green arrow), because the autonomous vehicle can minimize risk by waiting at the stop line for a protected turn instead loitering in the intersection to make an unprotected turn. The system may make the determination whether traversing the route requires the autonomous vehicle to execute an unprotected turn and/or whether it is appropriate for the autonomous vehicle to loiter at a certain position in the intersection based on one or more traffic rules, map information, or the like associated with the determined path. If the autonomous vehicle will not be required to execute an unprotected turn and/or or loitering in the intersection is not appropriate for the unprotected turn (204: NO), the autonomous vehicle may generate a trajectory (212) to traverse the intersection along the route using any now or hereafter trajectory generation methods.

However, if the autonomous vehicle will be required to execute an unprotected turn in which it is appropriate to loiter (204: YES), the system may determine a loiter pose (206) which is a pose at which the autonomous vehicle may wait or loiter for oncoming objects that have right-of-way in the lane conflicts to travel past the path before executing the unprotected turn through such lane conflicts. A loiter pose is typically within the intersection (i.e., beyond the stop line 110 shown in FIG. 1).

For determining the loiter pose, the system may first determine a stop location along the reference path using, for example, a 1D optimization or line search problem. Since a loiter pose has 3 degrees of freedom (x, y, yaw), the system may then use the stop location to determine a lateral offset and heading offset such that the autonomous vehicle footprint is outside of one or more conflict lanes by at least a target margin or distance. The stop location along with the lateral offset and yaw offset together specify a loiter pose. The lateral offset is the perpendicular distance between the stop location on the reference path and a reference point (e.g., center of gravity) of the autonomous vehicle when in loiter pose, and the yaw offset is the distance angle between the heading of the autonomous vehicle when in the loiter pose and the heading required to follow the reference path.

Figure 3:
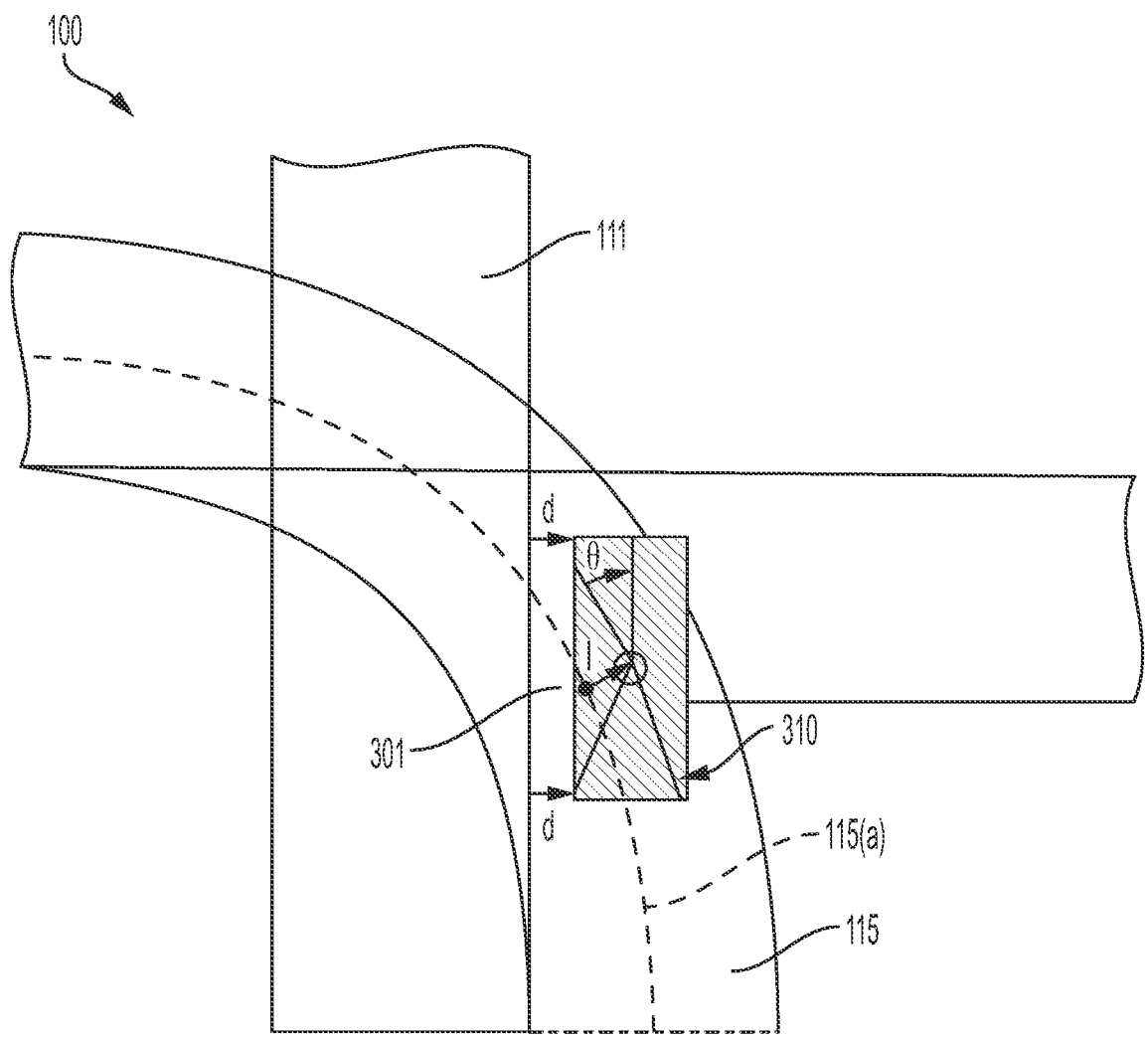
FIG. 3 illustrates an example loiter pose including a stop location, a lateral offset, and a yaw offset.

For example, FIG. 3 illustrates the loiter pose of the autonomous vehicle 101 when executing an unprotected left turn for traversing the intersection 100 shown in FIG. 1. As shown, the loiter pose includes a stop position at point 301 along the reference path 115(a), a lateral offset "l" and the yaw offset "Θ". The values of l and Θ are determined such that the minimal distance "d" between the footprint of the autonomous vehicle and any of the conflict lanes is greater than or equal to a defined margin or distance. For example, the margin may be configured such that the autonomous vehicle does not obstruct the opposing conflict lane 111. Additionally and/or alternatively, the margin may be configured such that the autonomous vehicle does not obstruct road-users behind the autonomous vehicle (e.g., an object that does not need to make the same unprotected turn as the autonomous vehicle) from passing the autonomous vehicle on the right and proceeding to another outlet of the intersection (e.g., proceed straight, turn right, etc.).

In various implementations, the system may determine the stop location with respect to the reference path and the corresponding loiter pose by optimizing a cost function that includes factors such as, without limitation, a stop location that signals to other road users the autonomous vehicle's intent that the autonomous vehicle will proceed through the intersection at the earliest opportunity, whether or not the stop location is kinematically infeasible to steer out of, duration that the autonomous vehicle will need to spend in one or more conflict regions when completing the turn out of the loiter pose, visibility of traffic signals (e.g., traffic lights) from the stop location, visibility of oncoming objects in conflict lanes from the stop location, whether or not the stop location is within an opposing lane, or the like. Such a cost function may assign different weights, penalties, rewards, etc. to each factor.

For example, the cost function may include a reward for a stop location that signals the autonomous vehicle's intent to other objects in the intersection that the autonomous vehicle will proceed through the intersection at the earliest opportunity and/or a penalty for stop locations that do not provide such a signal. Examples of such locations may include, without limitation, a crosswalk, a cross street, or the like. At signal-controlled intersections, this would signal to other objects in the intersection that the autonomous vehicle will proceed through the intersection on the current traffic signal cycle (i.e., red→green→red), because if the autonomous vehicle remained stopped in a cross walk, cross street, etc. after the traffic signal state changes, the autonomous vehicle would block cross traffic.

In another example, the cost function may include a penalty for stopping in locations from which it is not kinematically feasible for the autonomous vehicle to steer out of (i.e., the autonomous vehicle cannot find a kinematically feasible path from the loiter pose to the intersection outlet) and/or a reward for stopping in locations from which it is kinematically feasible for the autonomous vehicle to steer out of. The kinematic feasibility may be assessed by solving for a path from the loiter pose to a target location near the intersection outlet at which to rejoin the reference path that meets criteria which may include, without limitation, having curvature within the minimum turn radius capabilities of the autonomous vehicle, and staying within the drivable area. The path may be solved for using any now or hereafter known methods such as, without limitation, solving for a Dubin's path (which is the shortest curve between two points having known position and orientation represented by straight-line segments and arcs of constant radius), constructing a spline, or integrating a kinematic model of the autonomous vehicle over time.

Similarly, the cost function may include an increasing penalty (and/or a reducing reward) for increase in duration that the autonomous vehicle will need to spend in one or more conflict regions (e.g., conflict lanes) when completing the turn out of the loiter pose. The time required to traverse a conflict region may be a function of one or more dynamic limits of the autonomous vehicle (e.g., allowed longitudinal acceleration, allowed lateral acceleration, steering rate, etc.) as well as attributes of the path the autonomous vehicle will follow to complete the turn such as the curvature and/or curvature rate of the path, the length of the path within the conflict region, or the like.

In certain implementations, the cost function may include a penalty for a stop location from which traffic signals (e.g., traffic lights, etc.) are not visible and/or a reward for a stop location from which traffic signals are visible. Similarly, the cost function may include a penalty for a stop location from which objects heading towards the autonomous vehicle in conflict lanes are not visible and/or a reward for a stop location from which such objects are visible.

Additionally and/or alternatively, the cost function may include a penalty for a stop location that will cause at least some portion of the autonomous vehicle to occupy an opposing turn lane (i.e., turn lanes that turn in the opposite direction from the turn direction of the autonomous vehicle such as lane 114 shown in FIG. 1) and/or a reward for a stop location that does not cause the autonomous vehicle to occupy an opposing turn lane.

It should be noted that the system may determine the loiter pose before the autonomous vehicle is traversing an intersection (e.g., off-board the autonomous vehicle as part of the map generation process) in order to, for example, avoid consuming computational resources; avoid latency issues at runtime; or the like. Additionally and/or alternatively, the system may determine the loiter pose at runtime (e.g., on-board the autonomous vehicle) to account for real time perception information.

At the trajectory generation step 208 the system may continually plan a safe and feasible trajectory for the autonomous vehicle to traverse the intersection for each motion planning cycle or horizon. In one or more embodiments, the system may generate (208) the trajectory by receiving 281 real-time perception information (e.g., relating to the intersection and/or some area around the intersection). The real-time information may include, without limitation, perception information corresponding to one or more objects (stationary or moving) detected in the intersection, trajectory predictions relating to one or more detected objects, the environment of the autonomous vehicle (e.g., traffic lights, stop signs, intersections, pedestrian cross-walks, map information, etc.), current state information of the autonomous vehicle, or the like. Furthermore, trajectory generation 306 may be performed in curvilinear space corresponding to the intersection with respect to a reference path. The reference path establishes topological relationships between the autonomous vehicle and the objects/locations in the curvilinear space. In this space, the autonomous vehicle can take discrete actions to be ahead of or behind something, or to the left or right.

The system may determine one or more distinct classes (based on an analysis of the received real-time information) of trajectories 282 (e.g., by performing topological planning), where each distinct class is associated with a set of trajectories that take the same discrete actions (e.g., discrete topological actions) with respect to executing the unprotected left turn at the intersection. Examples of such discrete actions may include, without limitation, stopping at the stop line (110 of FIG. 1)— typically chosen when there is a stop sign, red light, and/or other stop signal before the autonomous vehicle enters the intersection; stopping at the loiter pose in the intersection—typically chosen when the autonomous vehicle has to wait for objects passing through opposing conflict lanes over the entire planning horizon; proceed through the intersection but stop momentarily at the loiter pose (i.e., stop at the loiter pose for less than the planning horizon)—typically chosen when the autonomous vehicle has to wait for objects passing through opposing conflict lanes for less than the entire planning horizon (about 8-12 seconds, about 9-11 seconds, about 10 seconds, about 9 second, about 11 seconds, etc.); proceed through the intersection without stopping at the loiter pose, but still veering through the loiter pose—typically chosen when the autonomous vehicle determines that waiting for objects in opposing conflict lanes is not currently necessary, but there is a future possibility of having to wait; proceed through intersection without stopping and without veering through the loiter pose—typically chosen when there is no or negligible possibility of having to wait for objects in opposing conflict lanes; or the like. It should be noted that other actions the autonomous vehicle may perform for executing the unprotected turn are within the scope of this disclosure such as tracking behind an object, passing an object, changing lanes, stopping before an object, or the like. It will be understood to those of skill in the art that topological planning may also refer to tactical planning or behavior planning, and topologically distinct actions may be referred to as tactically or behaviorally distinct actions.

The system may, optionally, discard one or more of the classes of trajectories if they are determined to be infeasible based on the real-time perception information. For example, if the autonomous vehicle has already turned into an opposing conflict lane (e.g., lane 111 or lane 112 of FIG. 1), it is no longer feasible for the autonomous vehicle to wait at the loiter pose and any classes that stop at or veer through the loiter pose may be discarded. Similarly, when there are multiple neighboring turn lanes for the autonomous vehicle to execute the unprotected left turn, a loiter pose within the inner turn lane would infringe on the outer turn lane, and a class that includes the action of waiting and/or veering through such a loiter pose may be discarded. In another example, when a traffic signal supports a protected turn (green arrow), the autonomous vehicle may minimize risk by waiting at the stop line for a protected turn instead of executing an unprotected left turn, and a class that includes the action of waiting and/or veering through such a loiter pose may be discarded. Similarly, when an opposing conflict lane mutually yields to the autonomous vehicle's lane (e.g. at an all-way stop sign controlled intersection) the autonomous vehicle may minimize risk by waiting at the stop line for a protected turn instead of executing an unprotected left turn, and a class that includes the action of waiting and/or veering through such a loiter pose may be discarded.

The system may use the loiter pose to generate a constraint set (283) for class of trajectories, the constraint set including one or more constraints. A set of constraints defines a convex envelope (bounded area) in curvilinear space within which the autonomous vehicle trajectory is confined for a class of trajectories. As discussed above, the autonomous vehicle can take discrete actions for executing the unprotected turn for traversing the intersection, and each discrete action yields one or more constraints in curvilinear space. For example, the discrete action to stop at the stop line may yield a longitudinal constraint requiring the autonomous vehicle to not travel longitudinally beyond the stop line location. The discrete action to stop at the loiter pose may yield both a longitudinal constraint requiring the autonomous vehicle to not travel longitudinally beyond the loiter pose, as well as a lateral constraint requiring the autonomous vehicle to veer through the loiter pose. The discrete action to stop at the loiter pose may also yield a lateral constraint requiring the autonomous vehicle to keep to the right of the opposing neighbor conflict (for an unprotected left turn). The discrete action to proceed through the intersection without stopping, but still veering through the loiter pose may yield only a lateral constraint requiring the autonomous vehicle to veer through the loiter pose. The discrete action to proceed through the intersection without stopping or veering through the loiter pose may yield no longitudinal or lateral constraints. The above actions and constraints are provided for example purposes, and other possible actions and/or constraints are within the scope of this disclosure. Optionally, the system may also consider lateral and/or lateral constraints unrelated to making the unprotected turn in addition to the above described constraints (e.g., constraints for avoiding collisions with objects behind the autonomous vehicle).

At 284, the system may optimize a trajectory for each class of trajectories and corresponding constraint set to determine a candidate trajectory for that class. This optimization may be performed using model-predictive control or another algorithm, to generate a dynamically feasible and comfortable trajectory that satisfies the constraint set. The system may reduce the weight on loiter constraints such that relatively higher weights are assigned to constraints for reducing curvature and lateral acceleration. Similarly, the system may retract or reduce the longitudinal interval over which loiter constraints are enforced at higher speeds. These variations can produce smoother trajectories when the autonomous vehicle is traversing the intersection at high speed, without tracking behind any other objects in the lane conflicts.

At 285, the system may assign a score to the optimized trajectory of each class of trajectories, and select a best candidate trajectory based on the assigned scores (e.g., best trajectory selected as maximum reward or minimum cost depending on scoring criteria) to be used for executing the unprotected left turn. The score may be assigned based on for example, the real-time perception information of the autonomous vehicle; location and predicted trajectories of objects in the autonomous vehicle's environment; locations of intersections, lights, stop signs, loiter pose, or the like; location of permissible lane change regions; the planned path; the loiter pose; the stop line; or the like. In some embodiments, when scoring interactions with other road-users, the scoring function may model interaction with the autonomous vehicle. For example, the nominal predicted trajectory for a road-user may intersect with the planned trajectory of the autonomous vehicle, however the scoring function may determine the other road user is capable of decelerating or stopping. Specifically, the system may take into account real-time information such as, without limitation, perception information about the local region (e.g. traffic signal state) and the predicted trajectories of other objects (e.g. vehicles, pedestrians). In some embodiments, the predicted trajectories of other objects may be updated to model their interaction with the autonomous vehicle. For example, a vehicle in a cross conflict lane with respect to the autonomous vehicle may decelerate and/or stop when the autonomous vehicle is in a loiter pose to allow the autonomous vehicle to execute the left turn, and the optimized trajectory(ies) of such a vehicle may be updated accordingly.

The score may be assigned based on one or more factors and corresponding weights. For example, one factor can be a risk of collision where a trajectory that has a lesser risk of collision may be assigned a lower cost than a trajectory that has a higher risk of collision. Another example of a factor may be passenger comfort where a trajectory that does not require performing sudden braking or steering maneuvers may be assigned a lower cost than a trajectory that requires such maneuvers. Yet another example of a factor is the planned stop location in the intersection where a trajectory that requires stopping in the intersection at locations other than the determined loiter pose may be penalized or assigned a lower score compared to a trajectory that requires stopping at the loiter pose. For computing the score with respect to the stop location in the intersection, the system may, optionally, use the cost function discussed above for determining the stop location of a loiter pose (e.g., assign a lower score for stop locations that have a higher cost function or vice versa). The system may also consider a factor relating to indecision of the autonomous vehicle about whether to proceed through the intersection or wait at the loiter pose, which can cause uncomfortable oscillation in brake and steering commands by penalizing (or assigning low scores) to trajectories that involve such indecisions. For example, the system may assign a "hysteresis" penalty for changing the semantic decision between stop and proceed between planning cycles and/or assign a direct penalty on uncomfortable brake and steering controls.

It should be noted that for the autonomous vehicle to loiter in the loiter pose, certain typical penalties associated with existing trajectory generation methods may be omitted when assigning the score to the optimized trajectories, only for the purpose of executing the unprotected turn. For example, the system may omit the penalty for stopping within the intersection at a cross street because when loitering to execute a turn, stopping in the cross street is necessary to signal intent to proceed. In fact, as discussed above, a trajectory that requires the autonomous vehicle to stop in the loiter pose is awarded a higher score. Similarly, the system may omit the penalty for proceeding through the intersection on a red light for a limited threshold time after the light changes from green to red because sometimes it may be the only way to complete an unprotected turn (e.g., in heavy traffic flow), and is acceptable when the vehicle is already in a committed position in the intersection (i.e., the loiter pose)—discussed below in more detail.

The system may use the selected best candidate trajectory for navigating the autonomous vehicle for the current motion planning cycle or horizon (286). The system may then determine (210) whether the autonomous vehicle has finished executing the unprotected turn, and repeat the above loiter pose determination (206) and trajectory generation (208) steps until the vehicle reaches the destination.

Figure 4:
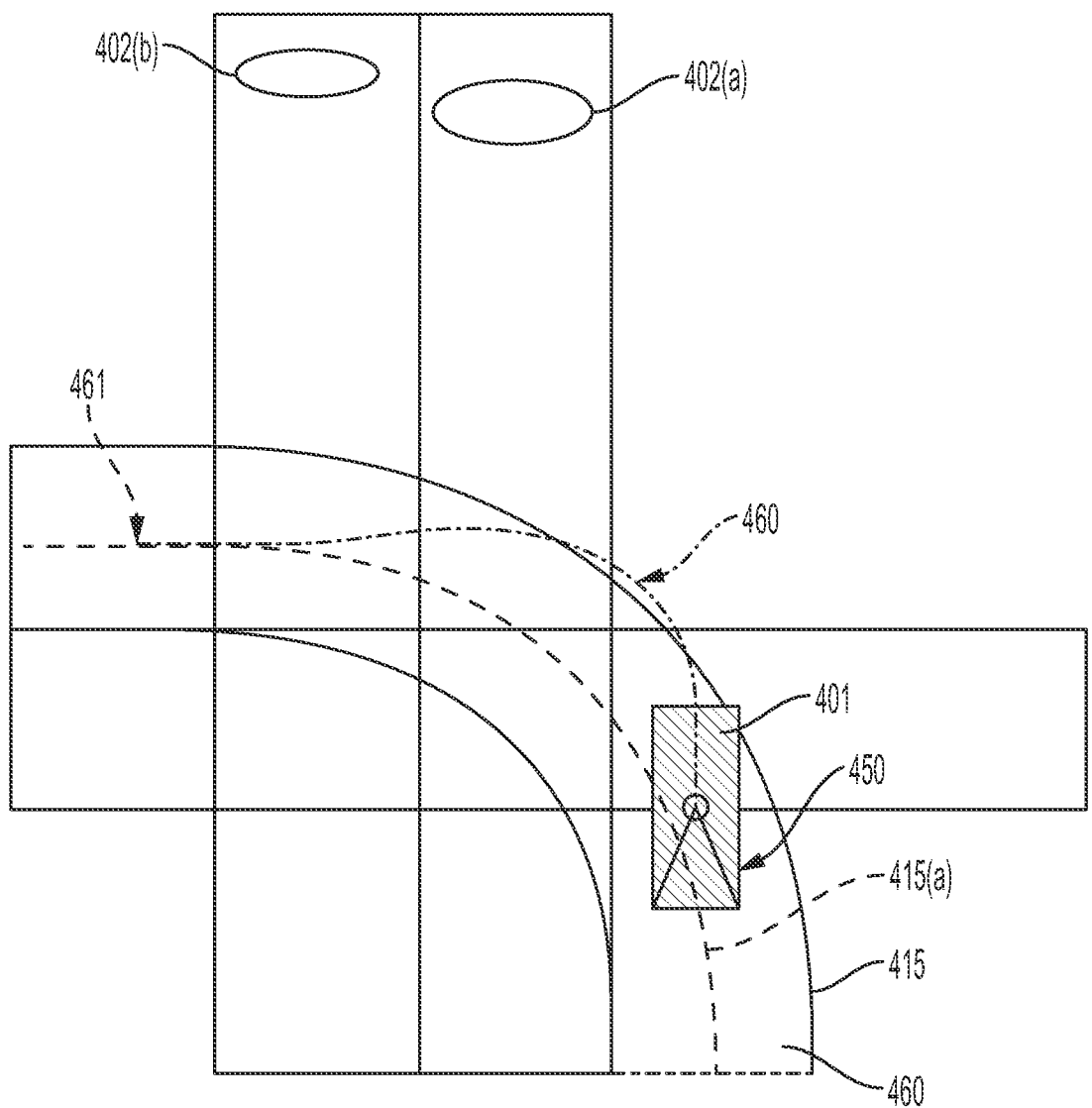
FIG. 4 illustrates an example loiter pose for executing an unprotected turn in the intersection 100 of FIG. 1.

A benefit of the described process is that instead of waiting indefinitely at a stop line outside the intersection before executing an unprotected turn (and often failing to complete the turn), the autonomous vehicle may loiter at a loiter pose within the intersection (similar to a human driver) to signal its intention of executing the turn at the earliest safe opportunity to other road-users in the intersection. For example, as shown in FIG. 4, when an autonomous vehicle 401 is planning to execute an unprotected left turn in lane 415 (having a reference path 415(*a*)), it may loiter at loiter pose 450 instead of waiting at a stop line 410. The autonomous vehicle may then complete the left turn when the objects 402(*a*) and 402(*b*) have either cleared the reference path 415(*a*) and/or yielded right-of-way to the autonomous vehicle 401. The autonomous vehicle may complete the unprotected turn from the loiter pose by following the trajectory 460 (that rejoins the reference path 415(*a*) at a target location 461), where the trajectory is determined using the above process.

It should be noted that while the autonomous vehicle may be able execute the unprotected left turn, from the loiter pose, while the traffic signal is green (i.e., when the autonomous vehicle is allowed to execute the turn), there may be situations where the autonomous vehicle may need to initiate and/or complete the turn after the traffic light has turned yellow and/or red. In such situations, while as per traffic laws, objects in the conflict lanes have right-of-way over the autonomous vehicle, social conventions allow a vehicle executing an unprotected turn to assert right-of-way over objects in the conflict lanes. Existing systems and methods either prevent the autonomous vehicle from finishing an unprotected turn on a red and/or yellow light when stopped at the loiter pose 450 shown in FIG. 4 (because the autonomous vehicle has not entered any conflicting lanes or crosswalks) causing the autonomous vehicle to stall indefinitely, or will always cause the autonomous vehicle to finish the unprotected turn irrespective of the duration of the yellow and/or red light causing the autonomous vehicle to take unreasonable risks. There is, therefore, a need for modeling rules for allowing the autonomous vehicle to complete an unprotected turn at a traffic signal even when the light turns yellow and/or red and the autonomous vehicle has not yet entered a conflict lane.

Figure 5:
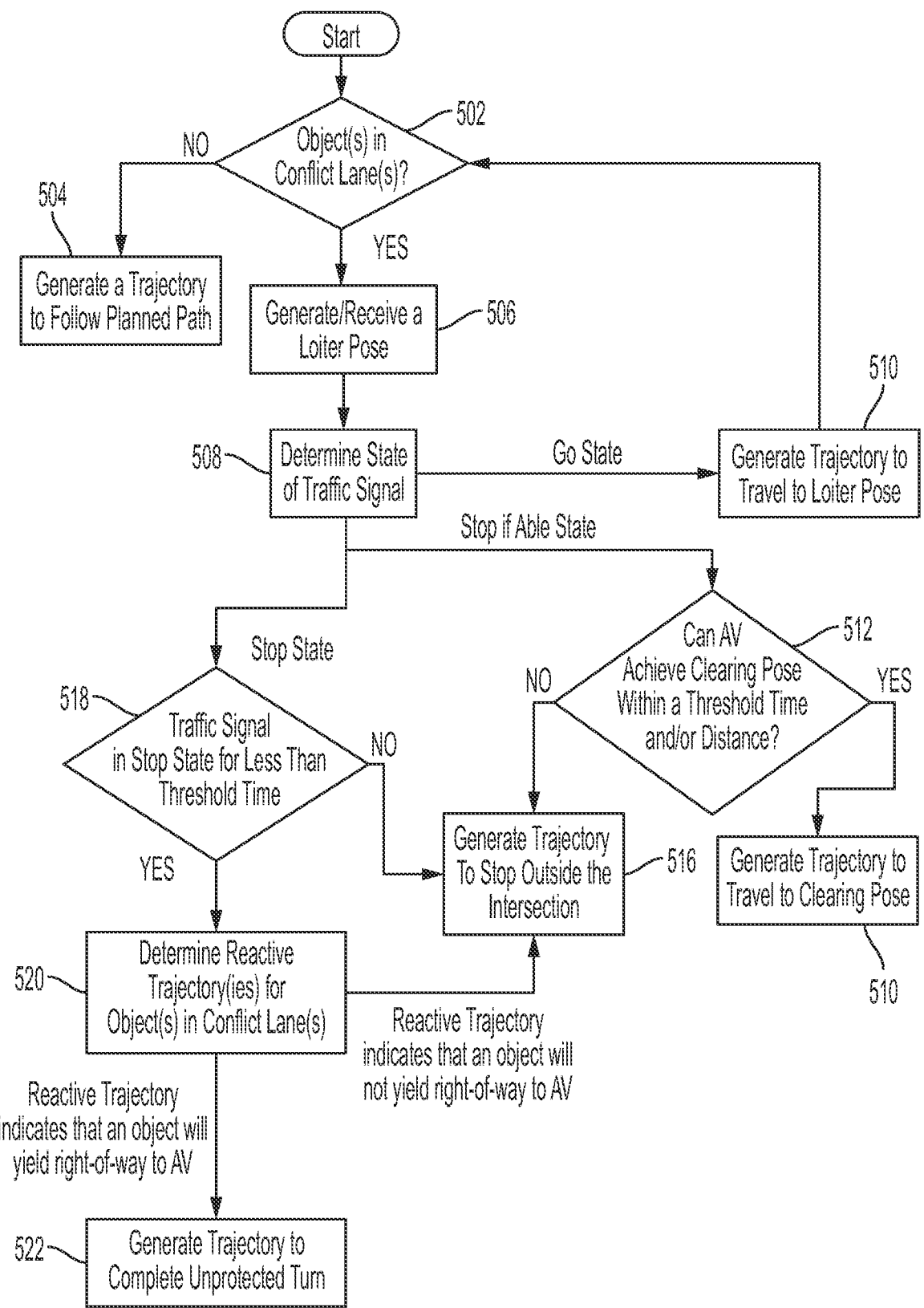
FIG. 5 illustrates a flowchart of an example method for example method for asserting right-of-way to finish unprotected turns through an intersection during a yellow and/or red light.

Referring now to FIG. 5, a flowchart illustrating an example method for asserting right-of-way to finish unprotected turns through an intersection during a yellow and/or red light is shown. As can be appreciated in light of the disclosure, the order of operation within the method is not limited to the sequential execution as illustrated in the figure, but may be performed in one or more varying orders as applicable and in accordance with the present disclosure. In various embodiments, the method can be scheduled to run based on one or more predetermined events, and/or can run continuously during operation of an autonomous vehicle.

When the autonomous vehicle is required to execute an unprotected turn along a planned path, the system may determine whether there are one or more objects in a conflict lane whose forecasted trajectory will intersect with the autonomous vehicle's planned path within a threshold time (502). The planned path may be the optimal path generated in FIG. 2.

In one or more embodiments, the system may make the determination based on real-time perception information (e.g., relating to the intersection and/or some area around the intersection). The real-time information may include, without limitation, perception information corresponding to one or more objects (stationary or moving) detected in the intersection, trajectory predictions relating to one or more detected objects, the environment of the autonomous vehicle (e.g., traffic lights, stop signs, intersections, pedestrian crosswalks, map information, etc.), current state information of the autonomous vehicle, or the like. The threshold time may be determined such that there may be a risk of collision between the object and the autonomous vehicle if both continue to move along their current or planned/forecasted trajectories.

If the system determines that there are no objects in a conflict lane whose forecasted trajectory will intersect with the autonomous vehicle's planned path within a threshold time (502: NO), the system may generate a trajectory from its current location for following the autonomous vehicle's planned path during the current planning horizon (504) using any now or hereafter know trajectory generation methods. The system may then continue performing step 502 in each subsequent planning horizon until the autonomous vehicle has finished executing the unprotected turn.

However, if the system determines that there are one or more objects in a conflict lane whose forecasted trajectory will intersect with the autonomous vehicle's planned path within a threshold time (502: YES), the system may receive and/or generate a loiter pose (506). As discussed above, a loiter pose is a pose within an intersection at which the autonomous vehicle must wait for oncoming traffic or pedestrians (i.e., objects that have right-of-way) to travel past the planned path of the autonomous vehicle before completing the unprotected turn. The system may generate the loiter pose as discussed above with respect to FIG. 2 (in real-time and/or at any time before the autonomous vehicle traverses the intersection.

At 508, the system may determine a state of the traffic signal (e.g., green, yellow, red, wait, or the like) at the intersection with respect to the autonomous vehicle's planned path (i.e., travel lane and direction). The system may identify the state of a traffic signal using any now or hereafter known methods. For example, using a combination of sensor data and detailed map information, the system may estimate an approximate location of a traffic signal. Then using templates, image matching color detection in images, etc. the system may determine the state of a traffic signal (e.g., red, yellow, or green). Alternatively, this information may be received from another device, such as a transmitter associated with a traffic signal light and/or from another vehicle which has made the determination. As such, the system may also determine when the traffic signal turns from green to yellow to red using any of the examples above.

If the state of the traffic signal is determined to be a "go" state for the autonomous vehicle's planned path (e.g., green) (508: GO), the system may generate a trajectory for the autonomous vehicle to travel to the loiter pose and loiter at the loiter pose (510). The system may then continue performing steps 502-508 in subsequent motion planning cycles.

Figure 6:
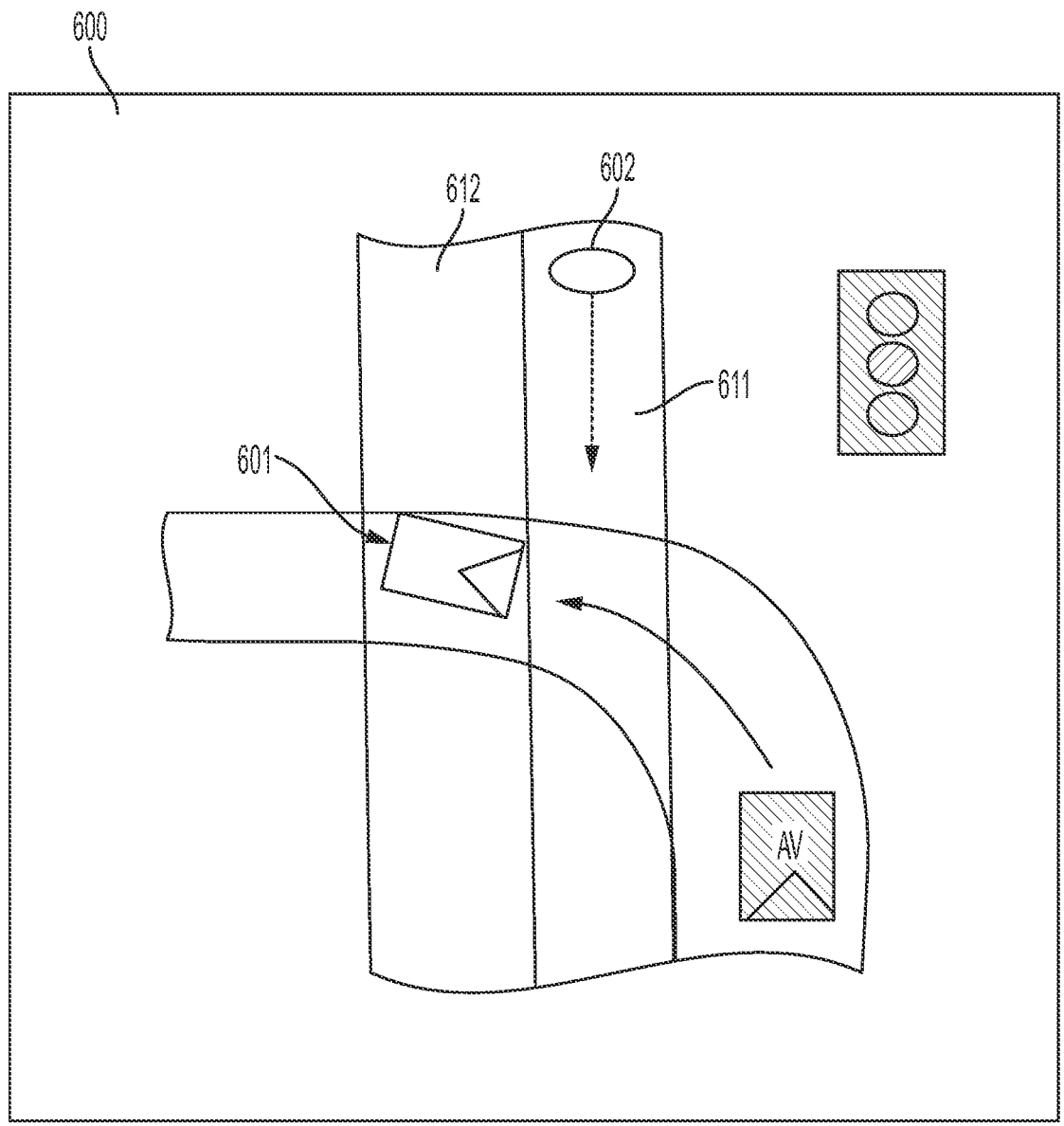
FIG. 6 illustrates an example clearing pose of an autonomous vehicle.

If the state of the traffic signal is determined to be a "stop if able" state (a transient state before the traffic signal changes to a stop state) for the autonomous vehicle's planned path (508: STOP IF ABLE), the system may determine whether the autonomous vehicle can achieve a clearing pose from its current pose within a threshold time and distance (512). An example of a stop if able state may be a yellow traffic light signal that is an indication that the light is transitioning from green to red and vehicles should stop before entering the intersection if able to safely do so. A clearing pose is the pose of the autonomous vehicle after it travels past the conflict lane(s) that was determined to include one or objects (in step 502) before the objects' forecasted intersection time with the autonomous vehicle's planned path. In various embodiments, the threshold time and/or distance may be determined based on, for example, socially acceptable driving convention in an area, traffic rules, or the like. For example, social convention may dictate that finishing an unprotected turn within 3-5 seconds after the traffic signal has turned red may be acceptable but not 30 seconds after the traffic signal has turned red. It should be noted that the determining whether the autonomous vehicle can achieve a clearing pose from its current pose within a threshold time and distance does not require determining whether the autonomous vehicle is able to travel past the complete intersection within such time and/or distance. For example, FIG. 6 illustrates that the clearing pose 601 of the autonomous vehicle 600 is achieved when it has traveled past conflict lane 611 that includes object(s) 602 that will intersect with the autonomous vehicle's planned path. However, the clearing pose is still within a conflict lane 612 (or other lane(s) of the intersection, and not outside the intersection 600.

The system may make the determination based on, for example, distance the autonomous vehicle will need to travel, the current speed of the autonomous vehicle, road speed limit, curvature along trajectory of the autonomous vehicle, minimum and maximum acceleration the autonomous vehicle can execute, smoothness of acceleration, as well as other traffic participants along the trajectory. Optionally, the system may make the determination that the autonomous vehicle can travel past the conflict lane(s) if the autonomous vehicle can clear a conflict lane at least a threshold time before the objects' forecasted intersection time with the autonomous vehicle's planned path. Such a threshold time may be determined based on, for example, passenger comfort, objects' forecasted trajectories, traffic rules, or the like.

If the system determines that the autonomous vehicle can achieve the clearing pose within the threshold time and/or distance (512: YES), the system may generate a trajectory for the autonomous vehicle to travel to the clearing pose (e.g., past one or more conflict lanes that include objects from its current location) before the objects' forecasted intersection time with the autonomous vehicle's planned path (514). It should be noted that such a trajectory may or may not require the autonomous vehicle to veer through the loiter pose. For example, the autonomous vehicle can still finish a turn even if it is unable to reach the desired loiter position such as when an object turning in an opposite direction (e.g., in lane 114 of FIG. 1) is infringing on the loiter position (for example, when the autonomous vehicle can finish making the turn within a threshold time/distance that is determined based on social convention).

If the system determines that the autonomous vehicle cannot achieve the clearing pose within the threshold time and/or distance (512: NO), the system may generate a trajectory to cause the autonomous vehicle to stop at a stop location outside the intersection (e.g., the stop line 110 shown in FIG. 1) (516) until at least a next "go" state of the traffic signal. If it is not possible for the autonomous vehicle to stop entirely outside the intersection, the system may generate a trajectory that stops a minimal distance into the intersection, short of entering any conflict lane(s) or crosswalks.

If the state of the traffic signal is determined to be in a "stop" state for the autonomous vehicle's planned path (e.g., red) (508: STOP), the system may determine whether the traffic signal has been in the stop state for less than a threshold time (518) before the autonomous vehicle's entry into the intersection. As discussed above, the threshold time may similarly be determined based on social convention, traffic rules, or the like. If the traffic signal is determined to have been in the stop state for less than a threshold time (518: YES), the system may determine a reactive trajectory (520) for the object(s) in the conflict lane(s). An object is expected to follow a reactive trajectory in response to the autonomous vehicle's planned future trajectory/action that asserts a right-of-way over the object even after the traffic signal is in a stop state for the autonomous vehicle (i.e., when the object has right-of-way as per the traffic rules of the intersection). Specifically, the reactive trajectory for an object considers whether or not the object will slow down and/or stop for the autonomous vehicle when the autonomous vehicle asserts right-of-way over the object in order to complete an unprotected turn even after the traffic signal is in a stop state for the autonomous vehicle. For example, the system may determine whether the object appears to be currently decelerating, and if the current deceleration profile of the object would be enough to keep them out of the autonomous vehicle's planned trajectory.

Determination of a reactive trajectory is described in U.S. patent application Ser. No. 17/034,366 filed Sep. 28, 2020, the disclosure of which is incorporated herein by reference in its entirety. For example, the system may use a parameterized motion model that is a longitudinal model to predict the reaction of the object to the autonomous vehicle asserting right-of-way over the object in order to complete an unprotected turn even after the traffic signal is in a stop state for the autonomous vehicle. The object is assumed to have the choice of whether to accelerate and traverse the intersection before the autonomous vehicle, or slow/stop for the autonomous vehicle to complete the unprotected turn. Thus, the object may have a choice between several possible reactive trajectories. The system may, therefore, assume that the object is behaving optimally or rationally with respect to some cost function, and that when faced with a choice (such as accelerate and pass, or slow/stop) the moving actor will choose the reactive trajectory having the relatively lower cost. The system may use any suitable cost function to determine the cost of each possible reactive trajectory for the object, and select the lowest cost reactive trajectory as the reactive trajectory for the object. For example, cost functions could be defined as polynomials, piecewise linear functions, sigmoids, or other functions. It should be noted that the cost function may reduce and/or eliminate any penalty (or add a reward) associated with the autonomous vehicle violating right-of-way traffic rules in a planned future action to enable selection of reactive trajectories that make objects that have actual right-of-way decelerate when the autonomous vehicle is at a traffic signal (i.e., entrance to an intersection). This results in potential autonomous vehicle trajectories that cause the autonomous vehicle to proceed through the traffic signal if, for example, the objects in conflict lanes will not have to decelerate more too hard to accommodate the autonomous vehicle.

If the determined reactive trajectory for each object in the conflict lane(s) of the autonomous vehicle's planned path indicates that the object will likely slow down and/or stop for the autonomous vehicle to complete the unprotected turn (i.e., yield right-of way), the system may generate a trajectory for the autonomous vehicle to complete the unprotected turn and clear the intersection (522).

If the traffic signal is determined to have been in the stop state for more than a threshold time (518: NO) and/or the determined reactive trajectory for an object in the conflict lane(s) of the autonomous vehicle's planned path indicates that the object will not slow and/or stop for the autonomous vehicle to complete the unprotected turn, the system may generate a trajectory to cause the autonomous vehicle to stop at a stop location outside the intersection (e.g., the stop line 110 shown in FIG. 1) (516).

A person of skill in the art will understand that the above methods may be used to navigate the autonomous vehicle for asserting right of way for traversing an intersection, irrespective of the presence of a traffic signal at the intersection (i.e., with or without a traffic signal). It should be noted that the intersections, lanes, and unprotected turns shown in the figures of this disclosure are for example purposes only, and the disclosure is not so limiting.

The above systems and methods enable an autonomous vehicle to follow social conventions (like a human driver) to complete an unprotected turn even after the traffic signal has turned yellow/red and the autonomous vehicle has not yet reached any conflict lanes. Unlike other systems and methods, the proposed disclosure does not attempt to model "point of commitment" to traffic signals as a fixed stop line outside the intersection. Instead, the principles of this disclosure model the trajectory for executing an unprotected turn depending on the state of the autonomous vehicle, the state of the traffic signal and/or the duration of the traffic signal allowing for more robust navigation through an intersection.

Figure 7:
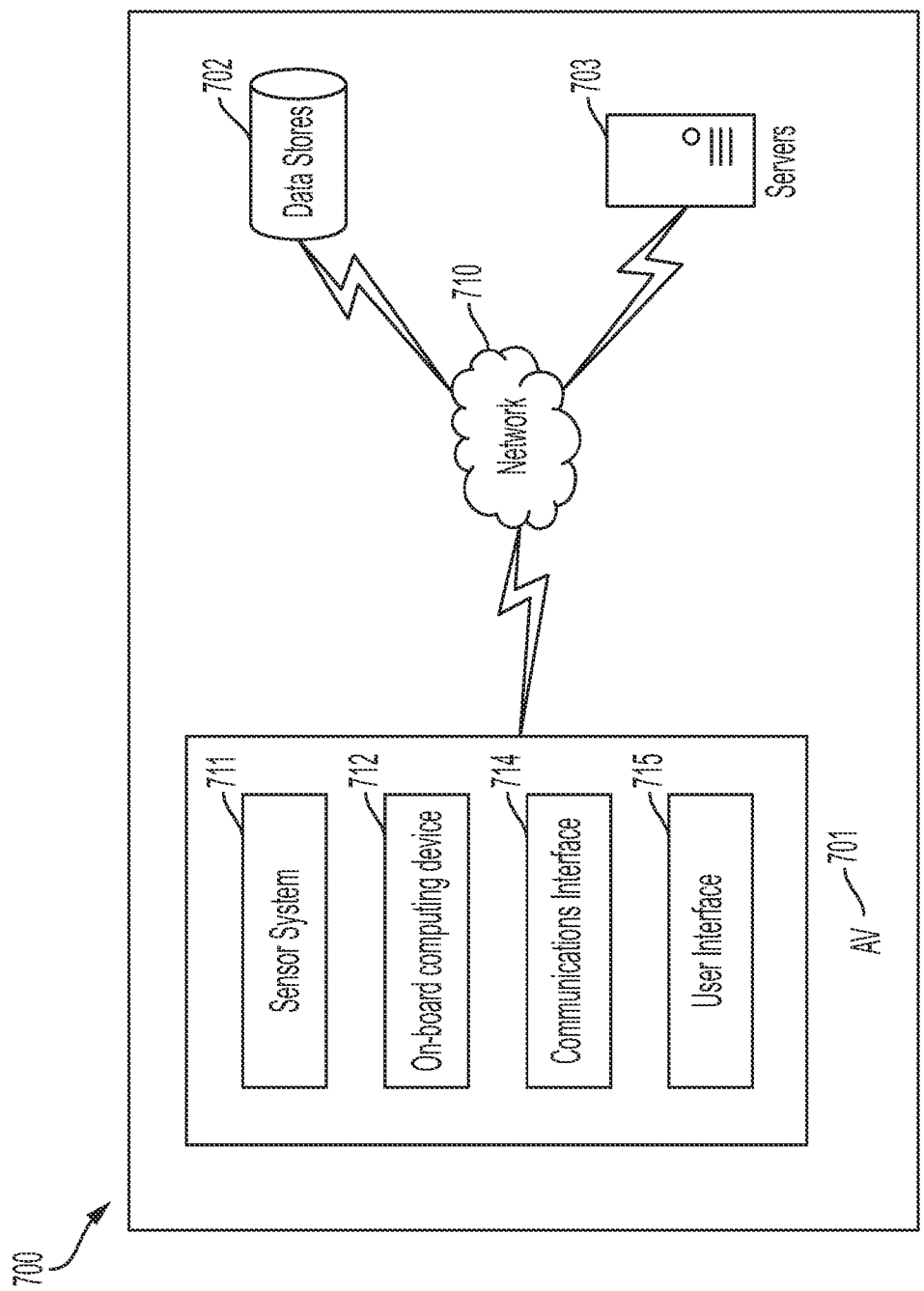
FIG. 7 illustrates an example system that includes an autonomous vehicle.

FIG. 7 is a block diagram illustrating an example system 700 that includes an autonomous vehicle 701 in communication with one or more data stores 702 and/or one or more servers 703 via a network 710. Although there is one autonomous vehicle shown, multiple autonomous vehicles may be coupled to each other and/or coupled to data stores 702 and/or servers 703 over network 710. Network 710 may be any type of network such as a local area network (LAN), a wide area network (WAN) such as the Internet, a cellular network, a satellite network, or a combination thereof, and may be wired or wireless. Data store(s) 702 may be any kind of data store such as, without limitation, map data store(s), traffic information data store(s), user information data store(s), point of interest data store(s), or any other type of content data store(s). Server(s) 703 may be any kind of servers or a cluster of servers, such as, without limitation, Web or cloud servers, application servers, backend servers, or a combination thereof.

As illustrated in FIG. 7, the autonomous vehicle 701 may include a sensor system 711, an on-board computing device 712, a communications interface 714, and a user interface 715. Autonomous vehicle 701 may further include certain components (as illustrated, for example, in FIG. 10) included in vehicles, such as, an engine, wheel, steering wheel, transmission, etc., which may be controlled by the on-board computing device 712 using a variety of communication signals and/or commands, such as, for example, acceleration signals or commands, deceleration signals or commands, steering signals or commands, braking signals or commands, etc.

The sensor system 711 may include one or more sensors that are coupled to and/or are included within the autonomous vehicle 701. Examples of such sensors include, without limitation, a LiDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 701, information about the environment itself, information about the motion of the autonomous vehicle 701, information about a route of the autonomous vehicle, or the like. As autonomous vehicle 701 travels over a surface, at least some of the sensors may collect data pertaining to the surface.

The LiDAR system may include a sensor configured to sense or detect objects and/or actors in an environment in which the autonomous vehicle 701 is located. Generally, LiDAR system is a device that incorporates optical remote sensing technology that can measure distance to a target and/or other properties of a target (e.g., a ground surface) by illuminating the target with light. As an example, the LiDAR system may include a laser source and/or laser scanner configured to emit laser pulses and a detector configured to receive reflections of the laser pulses. For example, the LiDAR system may include a laser range finder reflected by a rotating mirror, and the laser is scanned around a scene being digitized, in one, two, or more dimensions, gathering distance measurements at specified angle intervals. The LiDAR system, for example, may be configured to emit laser pulses as a beam. Optionally, the beam may be scanned to generate two dimensional or three dimensional range matrices. In an example, the range matrices may be used to determine distance to a given vehicle or surface by measuring time delay between transmission of a pulse and detection of a respective reflected signal. In some examples, more than one LiDAR system may be coupled to the first vehicle to scan a complete 370° horizon of the first vehicle. The LiDAR system may be configured to provide to the computing device a cloud of point data representing the surface(s), which have been hit by the laser. The points may be represented by the LiDAR system in terms of azimuth and elevation angles, in addition to range, which can be converted to (X, Y, Z) point data relative to a local coordinate frame attached to the vehicle. Additionally, the LiDAR may be configured to provide intensity values of the light or laser reflected off the surfaces that may be indicative of a surface type. In examples, the LiDAR system may include components such as light (e.g., laser) source, scanner and optics, photo-detector and receiver electronics, and position and navigation system. In an example, The LiDAR system may be configured to use ultraviolet (UV), visible, or infrared light to image objects and can be used with a wide range of targets, including non-metallic objects. In one example, a narrow laser beam can be used to map physical features of an object with high resolution.

It should be noted that the LiDAR systems for collecting data pertaining to the surface may be included in systems other than the autonomous vehicle 701 such as, without limitation, other vehicles (autonomous or driven), robots, satellites, etc.

Figure 8:
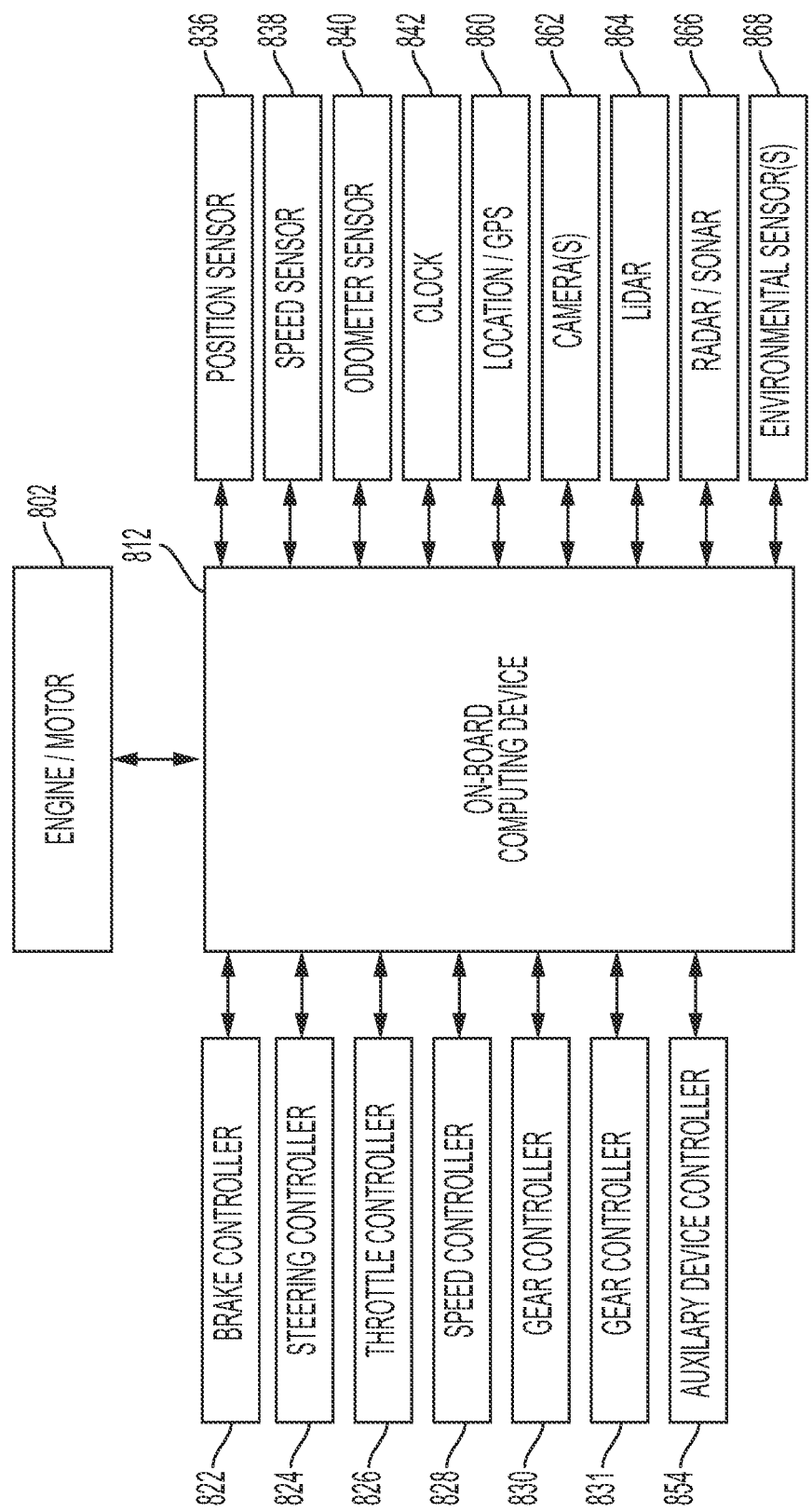
FIG. 8 illustrates block diagram of various components of an example controller of an autonomous vehicle.

FIG. 8 illustrates an example system architecture for a vehicle 801, such as the autonomous vehicle 701 of FIG. 1 autonomous vehicle. The vehicle 801 may include an engine or motor 802 and various sensors for measuring various parameters of the vehicle and/or its environment. Operational parameter sensors that are common to both types of vehicles include, for example: a position sensor 836 such as an accelerometer, gyroscope and/or inertial measurement unit; a speed sensor 838; and an odometer sensor 840. The vehicle 801 also may have a clock 842 that the system architecture uses to determine vehicle time during operation. The clock 842 may be encoded into the vehicle on-board computing device 812. It may be a separate device, or multiple clocks may be available.

The vehicle 801 also may include various sensors that operate to gather information about the environment in which the vehicle is traveling. These sensors may include, for example: a location sensor 860 such as a GPS device; object detection sensors such as one or more cameras 862; a LiDAR sensor system 864; and/or a radar and or and/or a sonar system 868. The sensors also may include environmental sensors 868 such as a precipitation sensor and/or ambient temperature sensor. The object detection sensors may enable the vehicle 801 to detect objects that are within a given distance or range of the vehicle 801 in any direction, while the environmental sensors collect data about environmental conditions within the vehicle's area of travel. The system architecture will also include one or more cameras 862 for capturing images of the environment. Any or all of these sensors will capture sensor data that will enable one or more processors of the vehicle's on-board computing device 812 and/or external devices to execute programming instructions that enable the computing system to classify objects in the perception data, and all such sensors, processors and instructions may be considered to be the vehicle's perception system. The vehicle also may receive information from a communication device (such as a transceiver, a beacon and/or a smart phone) via one or more wireless communication link, such as those known as vehicle-to-vehicle, vehicle-to-object or other V2X communication links. The term "V2X" refers to a communication between a vehicle and any object that the vehicle that may encounter or affect in its environment.

During operations, information is communicated from the sensors to an on-board computing device 812. The on-board computing device 812 analyzes the data captured by the sensors and optionally controls operations of the vehicle based on results of the analysis. For example, the on-board computing device 812 may control braking via a brake controller 822; direction via a steering controller 824; speed and acceleration via a throttle controller 826 (in a gas-powered vehicle) or a motor speed controller 828 (such as a current level controller in an electric vehicle); a differential gear controller 830 (in vehicles with transmissions); and/or other controllers such as an auxiliary device controller 854.

Geographic location information may be communicated from the location sensor 860 to the on-board computing device 812, which may then access a map of the environment that corresponds to the location information to determine known fixed features of the environment such as streets, buildings, stop signs and/or stop/go signals. Captured images from the cameras 862 and/or object detection information captured from sensors such as a LiDAR system 864 is communicated from those sensors to the on-board computing device 812. The object detection information and/or captured images may be processed by the on-board computing device 812 to detect objects in proximity to the vehicle 801. In addition or alternatively, the vehicle 801 may transmit any of the data to a remote server system 703 (FIG. 1) for processing. Any known or to be known technique for making an object detection based on sensor data and/or captured images can be used in the embodiments disclosed in this document.

In addition, the autonomous vehicle may include an onboard display device (not shown here) that may generate and output interface on which sensor data, vehicle status information, or outputs generated by the processes described in this document (e.g., various maps and routing information) are displayed to an occupant of the vehicle. The display device may include, or a separate device may be, an audio speaker that presents such information in audio format.

The on-board computing device 812 may obtain, retrieve, and/or create map data that provides detailed information about the surrounding environment of the autonomous vehicle 801. The on-board computing device 812 may also determine the location, orientation, pose, etc. of the AV in the environment (localization) based on, for example, three dimensional position data (e.g., data from a GPS), three dimensional orientation data, predicted locations, or the like. For example, the on-board computing device 812 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 812 in analyzing the surrounding environment of the autonomous vehicle 801.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on historical observations of vehicles or other objects over a period of time (e.g., reference paths for straight line travel, lane merge, a turn, or the like).

In certain embodiments, the on-board computing device 812 may also include and/or may receive information relating to the trip or route of a user, real-time traffic information on the route, or the like.

The on-board computing device 812 may include and/or may be in communication with a routing controller 831 that generates a navigation route from a start position to a destination position for an autonomous vehicle. The routing controller 831 may access a map data store to identify possible routes and road segments that a vehicle can travel on to get from the start position to the destination position. The routing controller 831 may score the possible routes and identify a preferred route to reach the destination. For example, the routing controller 831 may generate a navigation route that minimizes Euclidean distance traveled or other cost function during the route, and may further access the traffic information and/or estimates that can affect an amount of time it will take to travel on a particular route. Depending on implementation, the routing controller 831 may generate one or more routes using various routing methods, such as Dijkstra's algorithm, Bellman-Ford algorithm, or other algorithms. The routing controller 831 may also use the traffic information to generate a navigation route that reflects expected conditions of the route (e.g., current day of the week or current time of day, etc.), such that a route generated for travel during rush-hour may differ from a route generated for travel late at night. The routing controller 831 may also generate more than one navigation route to a destination and send more than one of these navigation routes to a user for selection by the user from among various possible routes.

In various embodiments, an on-board computing device 812 may determine perception information of the surrounding environment of the autonomous vehicle 801. Based on the sensor data provided by one or more sensors and location information that is obtained, the on-board computing device 812 may determine perception information of the surrounding environment of the autonomous vehicle 801. The perception information may represent what an ordinary driver would perceive in the surrounding environment of a vehicle. The perception data may include information relating to one or more objects in the environment of the autonomous vehicle 801. For example, the on-board computing device 812 may process sensor data (e.g., LiDAR or RADAR data, camera images, etc.) in order to identify objects and/or features in the environment of autonomous vehicle 801. The objects may include traffic signals, road way boundaries, other vehicles, pedestrians, and/or obstacles, etc. The on-board computing device 812 may use any now or hereafter known object recognition algorithms, video tracking algorithms, and computer vision algorithms (e.g., track objects frame-to-frame iteratively over a number of time periods) to determine the perception.

In some embodiments, the on-board computing device 812 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 812 may perform one or more prediction and/or forecasting operations. For example, the on-board computing device 812 may predict future locations, trajectories, and/or actions of one or more objects. For example, the on-board computing device 812 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 801, the surrounding environment, and/or their relationship(s). For example, if an object is a vehicle and the current driving environment includes an intersection, the on-board computing device 812 may predict whether the object will likely move straight forward or execute a turn. If the perception data indicates that the intersection has no traffic light, the on-board computing device 812 may also predict whether the vehicle may have to fully stop prior to enter the intersection.

In various embodiments, the on-board computing device 812 may determine a motion plan for the autonomous vehicle. For example, the on-board computing device 812 may determine a motion plan for the autonomous vehicle based on the perception data and/or the prediction data. Specifically, given predictions about the future locations of proximate objects and other perception data, the on-board computing device 812 can determine a motion plan for the autonomous vehicle 801 that best navigates the autonomous vehicle relative to the objects at their future locations.

In one or more embodiments, the on-board computing device 812 may receive predictions and make a decision regarding how to handle objects and/or actors in the environment of the autonomous vehicle 801. For example, for a particular actor (e.g., a vehicle with a given speed, direction, turning angle, etc.), the on-board computing device 812 decides whether to overtake, yield, stop, and/or pass based on, for example, traffic conditions, map data, state of the autonomous vehicle, etc. Furthermore, the on-board computing device 812 also plans a path for the autonomous vehicle 801 to travel on a given route, as well as driving parameters (e.g., distance, speed, and/or turning angle). That is, for a given object, the on-board computing device 812 decides what to do with the object and determines how to do it. For example, for a given object, the on-board computing device 812 may decide to pass the object and may determine whether to pass on the left side or right side of the object (including motion parameters such as speed). The on-board computing device 812 may also assess the risk of a collision between a detected object and the autonomous vehicle 801. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 812 may execute one or more control instructions to perform a cautious maneuver (e.g., mildly slow down, accelerate, change lane, or swerve). In contrast, if the collision cannot be avoided, then the on-board computing device 812 may execute one or more control instructions for execution of an emergency maneuver (e.g., brake and/or change direction of travel).

As discussed above, planning and control data regarding the movement of the autonomous vehicle is generated for execution. The on-board computing device 812 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and/or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 7, the communications interface 714 may be configured to allow communication between autonomous vehicle 701 and external systems, such as, for example, external devices, sensors, other vehicles, servers, data stores, databases etc. Communications interface 714 may utilize any now or hereafter known protocols, protection schemes, encodings, formats, packaging, etc. such as, without limitation, Wi-Fi, an infrared link, Bluetooth, etc. User interface system 716 may be part of peripheral devices implemented within a vehicle 701 including, for example, a keyboard, a touch screen display device, a microphone, and a speaker, etc.

Figure 9:
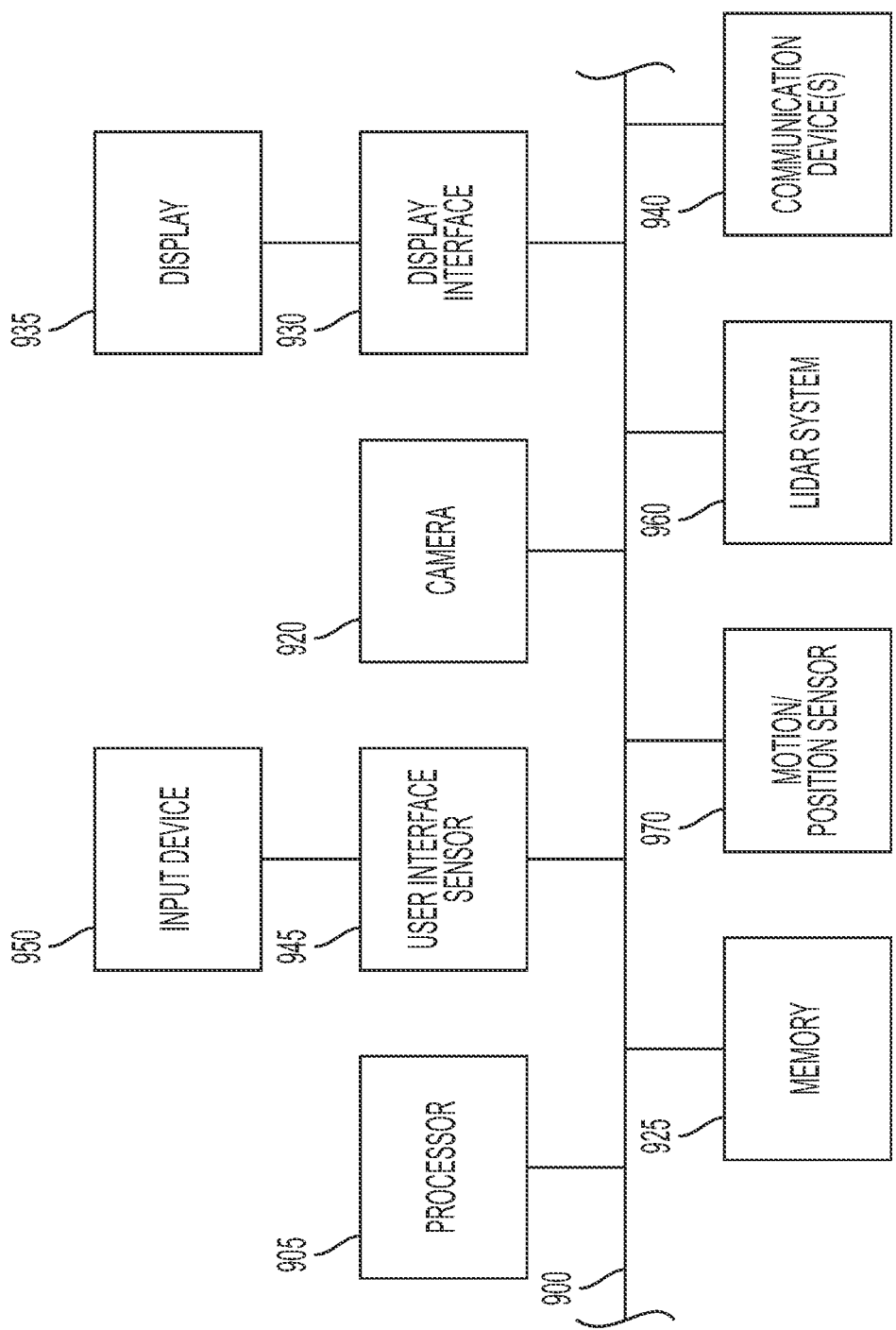
FIG. 9 is a block diagram of elements of a computing device on which the various systems and methods in this document could be implemented.

FIG. 9 depicts an example of internal hardware that may be included in any of the electronic components of the system, such as internal processing systems of the AV, external monitoring and reporting systems, or remote servers. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 930 may permit information from the bus 900 to be displayed on a display device 935 in visual, graphic or alphanumeric format, such on an in-dashboard display system of the vehicle. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard or keypad, a joystick, a touchscreen, a touch pad, a remote control, a pointing device and/or microphone. Digital image frames also may be received from a camera 920 that can capture video and/or still images. The system also may receive data from a motion and/or position sensor 980 such as an accelerometer, gyroscope or inertial measurement unit. The system also may receive data from a LiDAR system 960 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "road" are illustrated by way of example with vehicles traveling on one or more roads. However, the embodiments are intended to include lanes and roads in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility", "computer readable medium" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The term "object", when referring to an object that is detected by a vehicle perception system or simulated by a simulation system, is intended to encompass both stationary objects and moving (or potentially moving) actors, except where specifically stated otherwise by terms use of the term "actor" or "stationary object." As used herein, uncertain road users may include pedestrians, cyclists, individuals on roller skates, rollerblades, wheelchairs, individuals, or people in general, etc.

The term "traffic signal" refers to a set of cues (provided using, for example, electronically controlled lights, manual gestures, road signs, etc.) and that are used to control objects passing through an intersection of two or more roadways by giving a visual indication to the objects relating to when to proceed, when to slow, when to wait, when to stop, when to make a turn, or the like.

The term "trajectory" refers to the path the autonomous vehicle will actually follow for a planning horizon, and includes a velocity of the autonomous vehicle at points along the path.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A system for controlling navigation of an autonomous vehicle for making an unprotected turn while traversing an intersection, the system comprising:
   a non-transitory computer readable medium comprising one or more programming instructions that when executed by a processor, will cause the processor to:
   identify a loiter pose of an autonomous vehicle, the loiter pose being a pose of the autonomous vehicle for stopping at a point in an intersection before initiating an unprotected turn;
   initiate navigation of the autonomous vehicle to the loiter pose when a traffic signal is at a first state in which the autonomous vehicle is allowed to move through the intersection;
   during or after navigation of the autonomous vehicle to the loiter pose: determine whether the traffic signal has changed to a second state or a third state the second state being a transient state before the traffic signal will change to the third state in which the autonomous vehicle is not allowed to move through the intersection;
   in response to determining that the traffic signal has changed to the second state, generate a first trajectory for navigating the autonomous vehicle to execute the unprotected turn if an expected time for moving the autonomous vehicle from a current position to a position when the autonomous vehicle has fully exited an opposing conflict lane is less that a threshold time; and
   in response to determining that the traffic signal has changed to the third state:
   compute a reactive trajectory of an object in the opposing conflict lane, the reactive trajectory being indicative of a reaction of the object to the autonomous vehicle asserting right-of-way over the object when the traffic signal is in the third state,
   analyze the reactive trajectory to determine whether the object will yield right-of-way to the autonomous vehicle for executing the unprotected turn when the traffic signal is in the third state, and
   in response to determining that the object will yield right-of-way to the autonomous vehicle for executing the unprotected turn when the traffic signal is in the third state, generate a second trajectory for navigating the autonomous vehicle to execute the unprotected turn while the traffic signal is in the third state.

2. The system of claim 1, further comprising programming instructions that when executed by the processor, will cause the processor to: in response to determining that the traffic signal has changed to the second state, generate the first trajectory for navigating the autonomous vehicle to execute the unprotected turn if the distance between the current position of the autonomous vehicle and the position when the autonomous vehicle has fully exited the opposing conflict lane is less than a threshold distance.

3. The system of claim 1, further comprising programming instructions that when executed by the processor, will cause the processor to:
during or after navigation of the autonomous vehicle to the loiter pose, determine whether the traffic signal has changed to the third state; and
in response to determining that the traffic signal has changed to the third state:
analyze real-time conditions of the intersection; and
determine that the real-time conditions do not indicate a collision risk in response to determining that the object will yield right-of-way to the autonomous vehicle for executing the unprotected turn when the traffic signal is in the third state.

4. The system of claim 3, further comprising programming instructions that when executed by the processor, will cause the processor to:
determine that the real-time conditions indicate the collision risk in response to determining that the object will not yield right-of-way to the autonomous vehicle for executing the unprotected turn when the traffic signal is in the third state; and
if the real-time conditions indicate the collision risk, generate a third trajectory for navigating the autonomous vehicle to come to a stop at a stop position outside the intersection.

5. The system of claim 3, further comprising programming instructions that when executed by the processor, will cause the processor to analyze real-time conditions of the intersection only in response to determining that the traffic signal has been in the third state for less than a first threshold time before the autonomous vehicle will enter the intersection.

6. The system of claim 1, wherein the programming instructions that when executed by the processor, will cause the processor to compute the reactive trajectory comprise programming instructions that will cause the processor to use a cost function for computing the reactive trajectory, the cost function not including a penalty for the autonomous vehicle violating right-of-way traffic rules in asserting right-of-way over the object when the traffic signal is in the third state.

7. The system of claim 1, further comprising programming instructions that when executed by the processor, will cause the processor to: in response to determining that the traffic signal has changed to the second state, generate a third trajectory for navigating the autonomous vehicle to come to a stop at a stop position outside the intersection if the expected time for moving the autonomous vehicle from the current position to the position when the autonomous vehicle has fully exited the opposing conflict lane is more than the threshold time.

8. The system of claim 1, further comprising one or more programming instructions that when executed by the processor, will cause the processor to identify the loiter pose of the autonomous vehicle only in response to determining that there is an object in a conflict lane whose forecasted trajectory will intersect with the autonomous vehicle's planned path for traversing the intersection within a threshold time.

9. The system of claim 1, further comprising one or more programming instructions that when executed by the processor, will cause the processor to determine whether the expected time for moving the autonomous vehicle from the current position of the autonomous vehicle to the position when the autonomous vehicle has fully exited the opposing conflict lane is less than the threshold time based on at least one of the following: a distance the autonomous vehicle will need to travel, a current speed of the autonomous vehicle, a road speed limit, a curvature along a trajectory of the autonomous vehicle, a minimum acceleration the autonomous vehicle can execute, a maximum acceleration the autonomous vehicle can execute, a desired smoothness of acceleration, or information about one or more objects in the intersection.

10. The system of claim 1, further comprising one or more programming instructions that when executed by the processor, will cause the processor to cause the autonomous vehicle to execute the unprotected turn using the first trajectory.

11. The system of claim 1, wherein the loiter pose comprises:
a stop location along a reference path for traversing the intersection;
a lateral offset between the stop location and a reference point of the autonomous vehicle when in the loiter pose; and
a yaw offset between a first heading of the autonomous vehicle when in the loiter pose and a second heading required to follow the reference path.

12. The system of claim 11, wherein the one or more programming instructions that when executed by the processor, will cause the processor to identify the loiter pose further comprise programming instructions that will cause the processor to determine the stop location based on a cost function that comprises at least one of the following factors:
a stop location that signals to other road users the autonomous vehicle's intent that the autonomous vehicle will proceed through the intersection at an earliest opportunity;
kinematic feasibility of the autonomous vehicle to steer out of the loiter pose;
duration that the autonomous vehicle will need to spend in one or more conflict regions when completing the unprotected turn out of the loiter pose;
visibility of traffic signals from the loiter pose;
visibility of oncoming objects in conflict lanes from the loiter pose; or
the loiter pose being within an opposing lane.

13. The system of claim 12, wherein the one or more programming instructions that when executed by the processor, will cause the processor to determine the loiter pose further comprise programming instructions that will cause the processor to determine the lateral offset and the yaw offset such that a minimum distance between a footprint of the autonomous vehicle when in the loiter pose and a conflict lane of the intersection is greater than or equal to a target distance.

14. The system of claim 13, wherein the target distance is determined such that an object in the conflict lane can pass the autonomous vehicle when in the loiter pose without colliding with the autonomous vehicle.

15. A method for controlling navigation of an autonomous vehicle for making an unprotected turn while traversing an intersection, the method comprising, by a processor:
identifying a loiter pose of an autonomous vehicle, the loiter pose being a pose of the autonomous vehicle for stopping at a point in an intersection before initiating an unprotected turn;

initiating navigation of the autonomous vehicle to the loiter pose when a traffic signal is at a first state in which the autonomous vehicle is allowed to move through the intersection;

during or after navigation of the autonomous vehicle to the loiter pose: determining whether the traffic signal has changed to a second state or a third state, the second state being a transient state before the traffic signal will change to the third state in which the autonomous vehicle is not allowed to move through the intersection;

in response to determining that the traffic signal has changed to the second state, generating a first trajectory for navigating the autonomous vehicle to execute the unprotected turn if an expected time for moving the autonomous vehicle from a current position to a position when the autonomous vehicle has fully exited an opposing conflict lane is less that a threshold time; and in response to determining that the traffic signal has changed to the third state:
  computing a reactive trajectory of an object in the opposing conflict lane, the reactive trajectory being indicative of a reaction of the object to the autonomous vehicle asserting right-of-way over the object when the traffic signal is in the third state,
  analyzing the reactive trajectory to determine whether the object will yield right-of-way to the autonomous vehicle for executing the unprotected turn when the traffic signal is in the third state, and
  in response to determining that the object will yield right-of-way to the autonomous vehicle for executing the unprotected turn when the traffic signal is in the third state, generating a second trajectory for navigating the autonomous vehicle to execute the unprotected turn while the traffic signal is in the third state.

16. The method of claim 15, further comprising, in response to determining that the traffic signal has changed to the second state, generating the first trajectory for navigating the autonomous vehicle to execute the unprotected turn if a distance between the current position of the autonomous vehicle and the position when the autonomous vehicle has fully exited the opposing conflict lane is less than a threshold distance.

17. The method of claim 15, further comprising:
during or after navigation of the autonomous vehicle to the loiter pose, determining whether the traffic signal has changed to the third state; and
in response to determining that the traffic signal has changed to the third state:
  analyzing real-time conditions of the intersection; and
  determining that the real-time conditions do not indicate a collision risk in response to determining that the object will yield right-of-way to the autonomous vehicle for executing the unprotected turn when the traffic signal is in the third state.

18. The method of claim 17, further comprising:
determining that the real-time conditions indicate the collision risk in response to determining that the object will not yield right-of-way to the autonomous vehicle for executing the unprotected turn when the traffic signal is in the third state; and
if the real-time conditions indicate the collision risk, generating a third trajectory for navigating the autonomous vehicle to come to a stop at a stop position outside the intersection.

19. The method of claim 17, further comprising analyzing real-time conditions of the intersection only in response to determining that the traffic signal has been in the third state for less than a first threshold time before the autonomous vehicle will enter the intersection.

20. The method of claim 15, wherein computing the reactive trajectory comprises using a cost function for computing the reactive trajectory, the cost function not including a penalty for the autonomous vehicle violating right-of-way traffic rules in asserting right-of-way over the object when the traffic signal is in the third state.

21. The method of claim 15, further comprising, in response to determining that the traffic signal has changed to the second state, generating a third trajectory for navigating the autonomous vehicle to come to a stop at a stop position outside the intersection if the expected time for moving the autonomous vehicle from the current position to the position when the autonomous vehicle has fully exited the opposing conflict lane is more than the threshold time.

22. The method of claim 15, further comprising identifying the loiter pose of the autonomous vehicle only in response to determining that there is an object in a conflict lane whose forecasted trajectory will intersect with the autonomous vehicle's planned path for traversing the intersection within a threshold time.

23. The method of claim 15, further comprising determining whether the expected time for moving the autonomous vehicle from the current position of the autonomous vehicle to the position when the autonomous vehicle has fully exited the opposing conflict lane is less than the threshold time based on at least one of the following: a distance the autonomous vehicle will need to travel, a current speed of the autonomous vehicle, a road speed limit, a curvature along a trajectory of the autonomous vehicle, a minimum acceleration the autonomous vehicle can execute, a maximum acceleration the autonomous vehicle can execute, a desired smoothness of acceleration, or information about one or more objects in the intersection.

24. The method of claim 15, further comprising causing the autonomous vehicle to execute the unprotected turn using the first trajectory.

25. The method of claim 15, wherein the loiter pose comprises:
  a stop location along a reference path for traversing the intersection;
  a lateral offset between the stop location and a reference point of the autonomous vehicle when in the loiter pose; and
  a yaw offset between a first heading of the autonomous vehicle when in the loiter pose and a second heading required to follow the reference path.

26. The method of claim 25, wherein identifying the loiter pose further comprises determining the stop location based on a cost function that comprises at least one of the following factors:
  a stop location that signals to other road users the autonomous vehicle's intent that the autonomous vehicle will proceed through the intersection at an earliest opportunity;
  kinematic feasibility of the autonomous vehicle to steer out of the loiter pose;
  duration that the autonomous vehicle will need to spend in one or more conflict regions when completing the unprotected turn out of the loiter pose;
  visibility of traffic signals from the loiter pose;
  visibility of oncoming objects in conflict lanes from the loiter pose; or
  the loiter pose being within an opposing lane.

27. The method of claim 26, wherein determining the loiter pose further comprises determining the lateral offset and the yaw offset such that a minimum distance between a footprint of the autonomous vehicle when in the loiter pose and a conflict lane of the intersection is greater than or equal to a target distance.

28. The method of claim 27, wherein the target distance is determined such that an object in the conflict lane can pass the autonomous vehicle when in the loiter pose without colliding with the autonomous vehicle.

* * * * *